(12) United States Patent
Matsumura et al.

(10) Patent No.: US 12,110,385 B2
(45) Date of Patent: Oct. 8, 2024

(54) CHLORINATED VINYL CHLORIDE RESIN

(71) Applicants: SEKISUI CHEMICAL CO., LTD., Osaka (JP); TOKUYAMA SEKISUI CO., LTD., Osaka (JP)

(72) Inventors: Kenichi Matsumura, Yamaguchi (JP); Norikazu Mashino, Yamaguchi (JP); Kento Murakami, Yamaguchi (JP); Nami Nakajima, Osaka (JP); Yasunari Kusaka, Osaka (JP); Takehisa Sugaya, Yamaguchi (JP); Masahiko Yamagata, Tokyo (JP)

(73) Assignees: SEKISUI CHEMICAL CO., LTD., Osaka (JP); TOKUYAMA SEKISUI CO., LTD., Osaka (JP)

( * ) Notice: Subject to any disclaimer, the term of this patent is extended or adjusted under 35 U.S.C. 154(b) by 523 days.

(21) Appl. No.: 17/436,910

(22) PCT Filed: Mar. 27, 2020

(86) PCT No.: PCT/JP2020/014241
§ 371 (c)(1),
(2) Date: Sep. 7, 2021

(87) PCT Pub. No.: WO2020/203858
PCT Pub. Date: Oct. 8, 2020

(65) Prior Publication Data
US 2022/0145061 A1 May 12, 2022

(30) Foreign Application Priority Data

Mar. 29, 2019 (JP) .................... 2019-068512
Nov. 12, 2019 (JP) .................... 2019-204831

(51) Int. Cl.
*C08F 8/22* (2006.01)
*C08L 27/24* (2006.01)

(52) U.S. Cl.
CPC ............. *C08L 27/24* (2013.01); *C08F 8/22* (2013.01); *C08L 2201/08* (2013.01); *C08L 2203/30* (2013.01)

(58) Field of Classification Search
None
See application file for complete search history.

(56) References Cited

U.S. PATENT DOCUMENTS

| | | | | |
|---|---|---|---|---|
| 4,049,517 A | * | 9/1977 | Adachi | ...... C08F 8/22 522/132 |
| 2010/0063247 A1 | | 3/2010 | Sanni et al. | |
| 2010/0316904 A1 | * | 12/2010 | Zhang | ...... H01M 10/0567 429/163 |
| 2014/0309325 A1 | * | 10/2014 | Inaoka | ...... C08F 8/22 522/132 |
| 2016/0200893 A1 | | 7/2016 | Matsumura | |
| 2017/0051081 A1 | * | 2/2017 | Munshi | ...... B01F 27/91 |
| 2017/0183491 A1 | | 6/2017 | Matsumura et al. | |

FOREIGN PATENT DOCUMENTS

| | | |
|---|---|---|
| CN | 104017115 | * 9/2014 |
| CN | 105555859 | 5/2016 |
| CN | 106232713 | 12/2016 |
| CN | 109071725 | 12/2018 |
| EP | 3 173 444 | 5/2017 |
| EP | 3 498 741 | 6/2019 |
| JP | 52-148546 | 12/1977 |
| JP | 03149244 | * 6/1991 |
| JP | 8-311286 | 11/1996 |
| JP | 11-1513 | 1/1999 |
| JP | 2000017128 | * 1/2000 |
| JP | 2000-186113 | 7/2000 |

(Continued)

OTHER PUBLICATIONS

China General Plastics Corporation, PVC Resin; (2015) pp. 1-2. (Year: 2015).*

(Continued)

Primary Examiner — David J Buttner
(74) Attorney, Agent, or Firm — Wenderoth, Lind & Ponack, L.L.P.

(57) ABSTRACT

The present invention provides a chlorinated polyvinyl chloride resin that not only has high heat resistance and high mechanical strength but also is excellent in molding processability and is very easy to soften and additionally enables production of a molded article with high gloss. The present invention relates to a chlorinated polyvinyl chloride resin, containing three components including a $A_{150}$ component, a $B_{150}$ component, and a $C_{150}$ component, and having a percentage of the $C_{150}$ component ($C_{150}$ component/($A_{150}$ component+$B_{150}$ component+$C_{150}$ component)) of 8.0% or more and 30.0% or less, the three components being identified by measuring the chlorinated polyvinyl chloride resin by a solid echo method using pulse NMR at 150° C. to give a free induction decay curve of $^1H$ spin-spin relaxation, and subjecting the free induction decay curve to waveform separation into three curves derived from the $A_{150}$ component, the $B_{150}$ component, and the $C_{150}$ component in order of shorter relaxation time using the least square method.

10 Claims, 1 Drawing Sheet

(56) References Cited

FOREIGN PATENT DOCUMENTS

| | | | |
|---|---|---|---|
| JP | 2001-181340 | | 7/2001 |
| JP | 2008031265 | * | 2/2008 |
| JP | 2010-77173 | | 4/2010 |
| JP | 2014-224176 | | 12/2014 |
| WO | 2014/178362 | | 11/2014 |
| WO | WO2016/075567 | * | 5/2016 |
| WO | 2018/138611 | | 8/2018 |

OTHER PUBLICATIONS

Titow, PVC Plastics (1990) pp. 53-101. (Year: 1990).*
International Search Report issued Jun. 16, 2020 in International (PCT) Application No. PCT/JP2020/014241.

* cited by examiner

CHLORINATED VINYL CHLORIDE RESIN

TECHNICAL FIELD

The present invention relates to a chlorinated polyvinyl chloride resin that not only has high heat resistance and high mechanical strength but also is excellent in molding processability and is very easy to soften and additionally enables production of a molded article with high gloss.

BACKGROUND ART

Polyvinyl chlorides generally have excellent mechanical strength, weather resistance, and chemical resistance. Polyvinyl chlorides are thus processed into various molded articles and used in various fields.

However, polyvinyl chlorides have poor heat resistance. This has led to the development of chlorinated polyvinyl chloride resins (CPVCs), which are polyvinyl chlorides chlorinated to have improved heat resistance.

For example, Patent Literature 1 discloses a chlorinated polyvinyl chloride resin obtained by a specific production method. Patent Literature 1 describes that such a resin has less initial discoloration in thermal molding and has excellent thermal stability.

CITATION LIST

Patent Literature

Patent Literature 1: WO 2014/178362

SUMMARY OF INVENTION

Technical Problem

Unfortunately, the chlorinated polyvinyl chloride resin disclosed in Patent Literature 1 contains many highly chlorinated portions. Therefore, it is easily decomposed by heat in molding and generates a large amount of hydrogen chloride gas, contaminating die surfaces. Moreover, molded articles obtained in such a manner may have scorch marks. The molded articles have poor continuous productivity in molding and poor molding processability. In addition, the chlorinated polyvinyl chloride resin may not provide a uniform molded article because the highly chlorinated portions are difficult to uniformly mix with less chlorinated portions due to the difference in melt viscosity, thus causing great shape unevenness in the resulting molded article.

In view of the technical problems in the prior art, the present invention aims to provide a chlorinated polyvinyl chloride resin that not only has high heat resistance and high mechanical strength but also is excellent in molding processability and is very easy to soften and additionally enables production of a molded article with high gloss.

Solution to Problem

The present invention relates to a chlorinated polyvinyl chloride resin, containing three components including a $A_{150}$ component, a $B_{150}$ component, and a $C_{150}$ component, and having a percentage of the $C_{150}$ component ($C_{150}$ component/($A_{150}$ component+$B_{150}$ component+$C_{150}$ component)) of 8.0% or more and 50.0% or less, the three components being identified by measuring the chlorinated polyvinyl chloride resin by a solid echo method using pulse NMR at 150° C. to give a free induction decay curve of $^1$H spin-spin relaxation, and subjecting the free induction decay curve to waveform separation into three curves derived from the $A_{150}$ component, the $B_{150}$ component, and the $C_{150}$ component in order of shorter relaxation time using the least square method.

The present invention is described in detail below.

The chlorinated polyvinyl chloride resin of the present invention contains three components including a $A_{150}$ component, a $B_{150}$ component, and a $C_{150}$ component, and has a percentage of the $C_{150}$ component ($C_{150}$ component/($A_{150}$ component+$B_{150}$ component+$C_{150}$ component)) of 8.0% or more and 50.0% or less, the three components being identified by measuring the chlorinated polyvinyl chloride resin by a solid echo method using pulse NMR at 150° C. to give a free induction decay curve of $^1$H spin-spin relaxation, and subjecting the free induction decay curve to waveform separation into three curves derived from the $A_{150}$ component, the $B_{150}$ component, and the $C_{150}$ component in order of shorter relaxation time using the least square method.

When the percentage of the $C_{150}$ component is within the above range, parts of the CPVC are easily softened in the process of molding, thereby achieving high molding processability.

The percentage of the $C_{150}$ component is preferably 9.0% or more and is preferably 30.0% or less.

Herein, pulse NMR refers to an analysis involving detecting a response signal to a pulse to obtain a $^1$H nuclear magnetic relaxation time of a sample. A free induction decay curve may be obtained as a pulse response. The free induction decay curve consists of overlapped multiple free induction decay curves derived from multiple components having different relaxation times. The relaxation times or the components thereof of the components having different relaxation times can be identified by waveform separation of the curve using the least square method. The analysis involving separation into three components using pulse NMR described above is a known technique. Examples of literatures describing the technique include JP 2018-2983 A.

The $A_{150}$ component is a component having a short relaxation time in pulse NMR measurement and refers to a hard component with low molecular mobility. The $C_{150}$ component is a component having a long relaxation time in pulse NMR measurement and refers to a soft component with high molecular mobility. The $B_{150}$ component has a relaxation time that is between those of the $A_{150}$ component and the $C_{150}$ component, and has molecular mobility that is between those of the $A_{150}$ component and the $C_{150}$ component.

The chlorinated polyvinyl chloride resin of the present invention has a percentage of the $A_{150}$ component ($A_{150}$ component/($A_{150}$ component+$B_{150}$ component+$C_{150}$ component)) of preferably 50.0% or more and preferably 70.0% or less.

The chlorinated polyvinyl chloride resin of the present invention has a percentage of the $B_{150}$ component ($B_{150}$ component/($A_{150}$ component+$B_{150}$ component+$C_{150}$ component)) of preferably 10.0% or more and preferably 30.0% or less.

The ratio of the percentage of the $B_{150}$ component to the percentage of the $A_{150}$ component (Percentage of $B_{150}$ component/Percentage of $A_{150}$ component) is preferably 0.1 or higher and is preferably 0.6 or lower.

The ratio of the percentage of the $C_{150}$ to the percentage of the $A_{150}$ component (Percentage of $C_{150}$ component/Percentage of $A_{150}$ component) is preferably 0.1 or higher and is preferably 0.6 or lower.

The relaxation time of the $A_{150}$ component is usually less than 0.020 milliseconds (hereafter, referred to as ms) The relaxation time of the $B_{150}$ component is usually 0.020 ms or more and less than 0.090 ms. The relaxation time of the $C_{150}$ component is usually 0.090 ms or more.

The relaxation time of the $A_{150}$ component is preferably 0.001 ms or more and is preferably 0.020 ms or less.

The relaxation time of the $C_{150}$ component is preferably 0.090 ms or more and is preferably 1.000 ms or less.

The ratio of the relaxation time of the $B_{150}$ component to the relaxation time of the $A_{150}$ component (Relaxation time of $B_{150}$ component/Relaxation time of $A_{150}$ component) is preferably 1 or higher and is preferably 90 or lower.

The ratio of the relaxation time of the $C_{150}$ component to the relaxation time of the $A_{150}$ component (Relaxation time of $C_{150}$ component/Relaxation time of $A_{150}$ component) is preferably 4.5 or higher and is preferably 1,000 or lower.

A product of the relaxation time of the $A_{150}$ component and the percentage of the $C_{150}$ component (Relaxation time (ms) of $A_{150}$ component×Percentage (%) of $C_{150}$ component) is preferably 0.098 (ms·%) or more and is preferably 1.500 (ms·%) or less.

When the product is within the above range, fluidity in molding and the strength of the molded article can both be achieved.

Preferably, the chlorinated polyvinyl chloride resin of the present invention contains two components including a $A_{100}$ component and a $B_{100}$ component, and has a percentage of the $B_{100}$ component ($B_{100}$ component/($A_{100}$ component+ $B_{100}$ component)) of 9.0% or more and 30.0% or less, and the two components are identified by measuring the chlorinated polyvinyl chloride resin by a solid echo method using pulse NMR at 100° C. to give a free induction decay curve of $^1H$ spin-spin relaxation, and subjecting the free induction decay curve to waveform separation into two curves derived from the $A_{100}$ component and the $B_{100}$ component in order of shorter relaxation time using the least square method.

When the percentage of the $B_{100}$ component is within the preferable range, the chlorinated polyvinyl chloride resin has high heat resistance and high mechanical strength and additionally enables production of a molded article with high gloss.

The percentage of the $B_{100}$ component is more preferably 9.1% or more and is more preferably 15.0% or less.

The chlorinated polyvinyl chloride resin of the present invention has a percentage of the $A_{100}$ component ($A_{100}$ component/($A_{100}$ component+$B_{100}$ component)) of preferably 70.0% or more and preferably 91.0% or less.

The relaxation time of the $A_{100}$ component is usually less than 0.020 ms. The relaxation time of the $B_{100}$ component is usually 0.020 ms or more.

The relaxation time of the $A_{100}$ component is preferably 0.001 ms or more and is preferably 0.020 ms or less.

The relaxation time of the $B_{100}$ component is preferably 0.020 ms or more and is preferably 1.000 ms or less.

The ratio of the relaxation time of the $B_{100}$ component to the relaxation time of the $A_{100}$ component (Relaxation time of $B_{100}$ component/Relaxation time of $A_{100}$ component) is preferably 1 or higher and is preferably 1,000 or lower.

A product of the relaxation time of the $A_{100}$ component and the percentage of the $B_{100}$ component (Relaxation time (ms) of $A_{100}$ component×Percentage (%) of $B_{100}$ component) is preferably 0.005 (ms·%) or more and is preferably 1 (ms·%) or less.

Preferably, the chlorinated polyvinyl chloride resin of the present invention contains two components including a $A_{30}$ component and a $B_{30}$ component, and has a percentage of the $B_{30}$ component ($B_{30}$ component/($A_{30}$ component+$B_{30}$ component)) of less than 2.0%, and the two components are identified by measuring the chlorinated polyvinyl chloride resin by a solid echo method using pulse NMR at 30° C. to give a free induction decay curve of $^1H$ spin-spin relaxation, and subjecting the free induction decay curve to waveform separation into two curves derived from the $A_{30}$ component and the $B_{30}$ component in order of shorter relaxation time using the least square method.

When the percentage of the $B_{30}$ component is less than 2.0%, moldability and unevenness-preventing properties can be further improved.

The percentage of the $B_{30}$ component is preferably 0.1% or more and is more preferably 1.9% or less.

The chlorinated polyvinyl chloride resin of the present invention has a percentage of the $A_{30}$ component ($A_{30}$ component/($A_{30}$ component+$B_{30}$ component)) of preferably 91.0% or more and preferably 99.9% or less.

The relaxation time of the $A_{30}$ component is usually less than 0.020 ms. The relaxation time of the $B_{30}$ component is usually 0.020 ms or more.

The relaxation time of the $A_{30}$ component is preferably 0.001 ms or more and is preferably less than 0.020 ms.

A product of the relaxation time of the $A_{30}$ component and the percentage of the $B_{30}$ component (Relaxation time (ms) of $A_{30}$ component×Percentage (%) of $B_{30}$ component) is preferably 0.25 (ms·%) or less.

When a graph with the measurement temperatures on the horizontal axis and the percentages of components on the vertical axis is drawn from the results obtained by the measurements at 30° C., 100° C., and 150° C., a chlorinated polyvinyl chloride resin giving a linear approximation curve with steeper slope is much easier to soften and is thus preferred.

A ratio of the percentage of the $A_{100}$ component to the percentage of the $A_{150}$ component (Percentage of $A_{100}$ component/Percentage of $A_{150}$ component) is preferably 1.0 or higher and is preferably 1.8 or lower.

A ratio of the percentage of the $B_{100}$ component to the percentage of the $C_{150}$ component (Percentage of $B_{100}$ component/Percentage of $C_{150}$ component) is preferably 0.03 or higher, more preferably 0.1 or higher and is preferably 4.0 or lower, more preferably 2.0 or lower.

A ratio of the relaxation time of the $A_{100}$ component to the relaxation time of the $A_{150}$ component (Relaxation time of $A_{100}$ component/Relaxation time of $A_{150}$ component) is preferably 0.05 or higher and is preferably 20 or lower.

A ratio of the relaxation time of the $B_{100}$ component to the relaxation time of the $C_{150}$ component (Relaxation time of $B_{100}$ component/Relaxation time of $C_{150}$ component) is preferably 0.002 or higher and is preferably 11 or lower.

Preferably, the chlorinated polyvinyl chloride resin of the present invention contains structural units (a) to (c) represented by the following formulas (a) to (c), and the proportion of the structural unit (a) is 5 mol % or higher, the proportion of the structural unit (b) is 40 mol % or lower, and the proportion of the structural unit (c) is 55 mol % or lower, relative to the total number of moles of the structural units (a), (b), and (c). Such a chlorinated polyvinyl chloride resin shows uniform gelling characteristics in melt kneading and can provide a molded article with less unevenness on the surface.

In the chlorinated polyvinyl chloride resin of the present invention, the proportion of the structural unit (a) is more preferably 30.0 mol % or higher, still more preferably 35.0 mol % or higher, and is preferably 90.0 mol % or lower, more preferably 60.0 mol % or lower, relative to the total number of moles of the structural units (a), (b), and (c).

The proportion of the structural unit (b) is preferably 5.0 mol % or higher, more preferably 15.0 mol % or higher, and is more preferably 30.0 mol % or lower, still more preferably 25.0 mol % or lower, relative to the total number of moles of the structural units (a), (b), and (c).

The proportion of the structural unit (c) is preferably 5.0 mol % or higher, more preferably 25.0 mol % or higher, and is more preferably 55.0 mol % or lower, still more preferably 40.0 mol % or lower, relative to the total number of moles of the structural units (a), (b), and (c).

[Chem. 1]

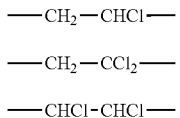

The molar ratios of the structural units (a), (b), and (c) in the chlorinated polyvinyl chloride resin reflect the site to which chlorine is introduced at the time of chlorination of the polyvinyl chloride (PVC). The PVC prior to chlorination is in a state where the proportion of the structural unit (a) is 100 mol %, and the proportions of the structural units (b) and (C) are 0 mol %. As chlorination proceeds, the proportion of the structural unit (a) decreases, while the proportions of the structural units (b) and (c) increase. At this time, nonuniformity of the chlorinated state will increase in a case where the proportion of the structural unit (b), which is unstable, excessively increases, or in a case where the chlorinated site and the unchlorinated site are unevenly present within the same particle of the chlorinated polyvinyl chloride resin. Increased nonuniformity causes variations in gelling characteristics in melt kneading of the chlorinated polyvinyl chloride resin, which will greatly impair the smoothness of the surface of a molded article.

In contrast, owing to the molar ratios of the structural units (a), (b), and (c) adjusted within the above range, the chlorinated polyvinyl chloride resin of the present invention has high uniformity and can exhibit good gelling characteristics in melt kneading.

The molar ratios of the structural units (a), (b), and (c) in the chlorinated polyvinyl chloride resin of the present invention can be measured by molecular structure analysis using NMR. NMR analysis can be performed in conformity with the method described in R. A. Komoroski, R. G. Parker, J. P. Shocker, Macromolecules, 1985, 18, 1257-1265.

In the chlorinated polyvinyl chloride resin of the present invention, the proportion of the structural unit (b) and the proportion of the structural unit (c) preferably satisfy the following relation:

0.3≤(Proportion of structural unit($b$)/Proportion of structural unit($c$))≤1.0.

In the chlorinated polyvinyl chloride resin of the present invention, the proportion of the structural unit (a) and the percentage of the $C_{150}$ component preferably satisfy the following relation:

0.1≤(Proportion of structural unit($a$)/Percentage of $C_{150}$ component)≤11.5.

The range is more preferably 1.5 or more and is more preferably 6.0 or less.

In the chlorinated polyvinyl chloride resin of the present invention, the proportion of the structural unit (a) and the percentage of the $B_{100}$ component preferably satisfy the following relation:

0.15≤(Proportion of structural unit($a$)/Percentage of $B_{100}$ component)≤10.

The range is more preferably 2.0 or more and is more preferably 7.0 or less.

In the chlorinated polyvinyl chloride resin of the present invention, the amount of added chlorine is preferably 1.0% by mass or more and is preferably 16.0% by mass or less.

When the amount of added chlorine is 1.0% by mass or more, a molded article to be obtained has sufficient heat resistance. When the amount of added chlorine is 16.0% by mass or less, moldability is improved.

The amount of added chlorine is more preferably 3.2% by mass or more, still more preferably 6.2% by mass or more. The amount is more preferably 15.2% by mass or less, still more preferably 12.2% by mass or less.

A polyvinyl chloride typically has a chlorine content of 56.8% by mass. The amount of added chlorine means the proportion of chlorine introduced into a polyvinyl chloride, and can be measured by the method specified in JIS K 7229.

In the chlorinated polyvinyl chloride resin of the present invention, the amount of added chlorine and the proportion of the structural unit (b) preferably satisfy the following relation:

0.3≤(Amount of added chlorine/Proportion of structural unit($b$))≤0.7.

In the chlorinated polyvinyl chloride resin of the present invention, the amount of added chlorine and the proportion of the structural unit (c) preferably satisfy the following relation:

0.2≤(Amount of added chlorine/Proportion of structural unit($c$))≤0.4.

In the chlorinated polyvinyl chloride resin of the present invention, the amount of added chlorine and the percentage of the $C_{150}$ component preferably satisfy the following relation:

0.2≤(Amount of added chlorine/Percentage of $C_{150}$ component)≤1.9.

In the chlorinated polyvinyl chloride resin of the present invention, the amount of added chlorine and the percentage of the $B_{150}$ component preferably satisfy the following relation:

0.1≤(Amount of added chlorine/Percentage of $B_{150}$ component)≤1.52.

The range is more preferably 0.11 or more, and is more preferably 0.70 or less.

The degree of polymerization of the chlorinated polyvinyl chloride resin of the present invention is preferably 100 or higher, more preferably 400 or higher, still more preferably 500 or higher. The degree of polymerization is preferably 2,000 or lower, more preferably 1,500 or lower.

When the degree of polymerization is within the above range, fluidity in molding and the strength of the molded article can both be achieved.

The chlorinated polyvinyl chloride resin of the present invention may be produced by, for example, a method including preparing a suspension in a reaction vessel by suspending a polyvinyl chloride in an aqueous medium, introducing chlorine into the reaction vessel, and heating the suspension to chlorinate the polyvinyl chloride.

The percentage of the $C_{150}$ component and the percentage of the $B_{100}$ component can be adjusted by changing conditions for the chlorination of the polyvinyl chloride, such as pressure, temperature, chlorine concentration, hydrogen peroxide concentration, chlorine consumption rate, or stirring condition.

The reaction vessel may be a commonly used vessel such as a glass-lined stainless steel reaction vessel or a titanium reaction vessel, for example.

The method of preparing the suspension of the polyvinyl chloride in an aqueous medium is not limited. For example, a cake-like PVC obtained by subjecting a polymerized PVC to monomer removal treatment may be used, or a dried PVC may be resuspended in an aqueous medium, or a suspension obtained by removing any substance undesired for the chlorination reaction from the polymerization system may be used. It is preferred to use a cake-like resin obtained by subjecting a polymerized PVC to monomer removal treatment.

The aqueous medium may be ion-exchanged pure water, for example. The amount of the aqueous medium is not limited. Generally, the amount is preferably 150 to 400 parts by mass based on 100 parts by mass of the PVC.

Chlorine to be introduced into the reaction vessel may be either liquid chlorine or gaseous chlorine. The use of liquid chlorine is efficient in that a large amount of chlorine can be charged into the reaction vessel in a short period of time. Chlorine may be added in the course of reaction to adjust the pressure or supply chlorine. At this time, gaseous chlorine in addition to liquid chlorine may be blown into the reaction vessel, as required. It is preferred to use chlorine after purging 5 to 10% by mass of chlorine from the cylinder.

The gauge pressure in the reaction vessel is not limited. Yet, it is preferably from 0 to 2 MPa, because the higher the chlorine pressure is, the more readily the chlorine will penetrate into the PVC particles.

The method of chlorinating the PVC in the suspended state is not limited. Examples of chlorination method include a method in which the excitation of bonding of the PVC and chlorine is brought about by thermal energy to accelerate the chlorination (hereinafter referred to as thermal chlorination); and a method in which light energy such as ultraviolet light is applied to accelerate the chlorination by photoreaction (hereinafter referred to as photo-chlorination). The heating method in the chlorination by thermal energy is not limited, and for example, heating with an external jacket from the reactor wall is effective.

The use of light energy such as ultraviolet light requires an apparatus capable of light energy irradiation such as ultraviolet irradiation under high temperature and high pressure conditions. In the photo-chlorination, the chlorination reaction temperature is preferably 40° C. to 80° C. In the photo-chlorination, the ratio of the light energy irradiation intensity (W) to the total amount (kg) of the raw material PVC and water is preferably 0.001 to 6 (W/kg). The irradiation light preferably has a wavelength of 280 to 420 nm.

The photo-chlorination allows the resulting chlorinated polyvinyl chloride resin to have high heat resistance and high mechanical strength and additionally to enable production of a molded article with high gloss.

The thermal chlorination is preferably performed at a temperature of 40° C. to 120° C. When the temperature is excessively low, the rate of chlorination will decrease. When the temperature is excessively high, dehydrochlorination reaction will occur along with the chlorination reaction, causing discoloration of the resulting CPVC. The heating temperature is more preferably 50° C. to 110° C. The heating method is not limited, and heating may be performed with an external jacket from the reaction vessel wall, for example.

During the chlorination, hydrogen peroxide is preferably further added to the suspension. Addition of hydrogen peroxide can improve the rate of chlorination. Hydrogen peroxide is preferably added in an amount of 5 to 500 ppm to the PVC per hour of the reaction time. When the amount of hydrogen peroxide added is excessively small, the effect of improving the rate of chlorination cannot be obtained. When the amount of hydrogen peroxide added is excessively large, the thermal stability of the CPVC will decrease.

When hydrogen peroxide is added as described above, the rate of chlorination is improved. Therefore, the heating temperature can be set relatively low. The heating temperature may be 65° C. to 110° C., for example.

Preferably, the chlorination is performed at a chlorine consumption rate of 0.010 to 0.015 kg/PVC-kg·5 min after the amount of added chlorine reaches a value that is five percentage points by mass lower than the final amount of added chlorine, and is further performed at a chlorine consumption rate of 0.005 to 0.010 kg/PVC-kg·5 min after the amount of added chlorine reaches a value that is three percentage points by mass lower than the final amount of added chlorine. Herein, the term "chlorine consumption rate" refers to the amount of chlorine consumed in five minutes per kilogram of the raw material PVC.

When chlorination is performed using the above method, a CPVC having less nonuniformity in the chlorinated state and having excellent thermal stability can be obtained.

In the above chlorination method, preferably, the chlorination is performed while the suspension is stirred. The suspension is stirred preferably under such conditions that the ratio of the vortex volume (unit: L) to the total mass (kg) of the raw material PVC and water (vortex volume/total mass of raw material PVC and water) is 0.009 to 0.143 (L/kg).

When the ratio is 0.009 (L/kg) or higher, chlorine in the gas phase in the reaction vessel can be sufficiently taken in the liquid phase. When the ratio is 0.143 (L/kg) or lower, the chlorine taken in the liquid phase is less likely to be re-released into the gas phase, allowing uniform chlorination.

The vortex volume means the volume of a vortex formed at the liquid-gas interface during stirring.

For example, the vortex volume can be calculated using thermal fluid and powder analysis software "R-FLOW" (produced by R-flow Corporation Ltd.).

Specifically, the vortex volume can be calculated based on the distance between the center of the stirring blade and the interface between the gas phase and the liquid phase in stirring. The stirring blade, which is the stirring power, produces pressure in the liquid and sets the liquid phase at a positive pressure and the gas phase at a negative pressure. This makes it possible to determine the interface between the gas phase and the liquid phase as the border between the positive pressure and the negative pressure.

The stirring blade rotation rate in stirring is preferably 10 to 500 rpm. The capacity of the vessel is preferably 0.01 m³ to 100 m³.

In the above chlorination method, the concentration of chlorine introduced into the reaction vessel is preferably 99.5% or higher.

A molded article can be produced by molding a resin composition for molding containing the chlorinated polyvinyl chloride resin of the present invention.

The present invention also encompasses a resin composition for molding containing the chlorinated polyvinyl chloride resin of the present invention.

The lower limit of the amount of the chlorinated polyvinyl chloride resin of the present invention in the resin composition for molding of the present invention is preferably 65% by mass, more preferably 70% by mass. The upper limit thereof is preferably 96% by mass, more preferably 93% by mass.

The resin composition for molding of the present invention may optionally contain additives such as stabilizers, lubricants, processing aids, impact resistance modifiers, heat resistance improvers, antioxidants, ultraviolet absorbents, light stabilizers, fillers, thermoplastic elastomers, pigments, and reinforcing agents.

Examples of the stabilizers include, but are not limited to, thermal stabilizers and thermal stabilization aids. Examples of the thermal stabilizers include, but are not limited to, organotin stabilizers, lead stabilizers, calcium-zinc stabilizers, barium-zinc stabilizers, and barium-cadmium stabilizers.

Examples of the organotin stabilizers include dibutyl tin mercapto, dioctyl tin mercapto, dimethyl tin mercapto, dibutyl tin mercapto, dibutyl tin maleate, dibutyl tin maleate polymers, dioctyl tin maleate, dioctyl tin maleate polymers, dibutyl tin laurate, and dibutyl tin laurate polymers.

Examples of the lead stabilizers include lead stearate, dibasic lead phosphite, and tribasic lead sulfate. These may be used singly or in combination of two or more thereof.

Examples of the thermal stabilization aids include, but are not limited to, epoxidized soybean oil, phosphate, polyol, hydrotalcite, and zeolite. These may be used singly or in combination of two or more thereof.

Examples of the lubricants include internal lubricants and external lubricants.

The internal lubricants are used to reduce the fluid viscosity of molten resin in molding to prevent the generation of frictional heat. Examples of the internal lubricants include, but are not limited to, butyl stearate, lauryl alcohol, stearyl alcohol, epoxidized soybean oil, glycerol monostearate, stearic acid, and bisamide. These may be used singly or in combinations of two or more.

The external lubricants are used to improve the slip effect between metal surfaces and molten resin in molding. Examples of the external lubricants include, but are not limited to, paraffin wax, polyolefin waxes, ester waxes, and montanic acid wax. These may be used singly or in combinations of two or more.

Examples of the processing aids include, but are not limited to, acrylic processing aids such as alkyl acrylate-alkyl methacrylate copolymers having a mass average molecular weight of 100,000 to 2,000,000. Examples of the acrylic processing aids include, but are not limited to, n-butyl acrylate-methyl methacrylate copolymers and 2-ethylhexyl acrylate-methyl methacrylate-butyl methacrylate copolymers. These may be used singly or in combination of two or more thereof.

Examples of the impact resistance modifiers include, but are not limited to, methyl methacrylate-butadiene-styrene copolymers (MBS), chlorinated polyethylene, and acrylic rubber.

Examples of the heat resistance improvers include, but are not limited to, α-methylstyrene resins and N-phenylmaleimide resins.

The lower limit of the amount of the impact resistance modifier in the resin composition for molding of the present invention is preferably 1% by mass, more preferably 2% by mass. The upper limit thereof is preferably 30% by mass, more preferably 15% by mass.

When the amount is within the range, a molded article to be obtained can obtain sufficient strength.

Examples of the antioxidants include, but are not limited to, phenolic antioxidants.

Examples of the light stabilizers include, but are not limited to, hindered amine light stabilizers.

Examples of the ultraviolet absorbents include, but are not limited to, salicylate ultraviolet absorbents, benzophenone ultraviolet absorbents, benzotriazole ultraviolet absorbents, and cyanoacrylate ultraviolet absorbents.

Examples of the fillers include, but are not limited to, calcium carbonate and talc.

Examples of the pigments include, but are not limited to, organic pigments such as azo pigments, phthalocyanine pigments, threne pigments, and dye lake pigments; and inorganic pigments such as oxide pigments, molybdenum chromate pigments, sulfide/selenide pigments, and ferrocyanide pigments.

Examples of the reinforcing agents include, but are not limited to, fibrous reinforcing agents and non-fibrous reinforcing agents. Examples of the fibrous reinforcing agents include glass fiber, carbon fiber, aramid fiber, polyethylene terephthalate fiber, cellulose nanofiber (CNF), and kenaf. Examples of the non-fibrous reinforcing agents include graphite and graphene.

In addition, a molded article molded from the resin composition for molding of the present invention is provided. The present invention also encompasses such a molded article.

The molded article may contain a reinforcing agent such as glass fiber or carbon fiber.

The molded article of the present invention can be formed into any shape by hot pressing, for example, and has excellent thermal moldability.

The molding method may be any conventionally known molding method, for example, extrusion molding or injection molding.

The molded article of the present invention has excellent thermal stability and good appearance. Therefore, the molded article of the present invention can be suitably used in applications such as building components, plumbing materials and equipment, and housing materials.

It is known that, if conventional members of transportation machinery or battery systems are faultily manufactured or inappropriately used, the battery cells may ignite. As the capacity of battery cells has been increased to meet the demand for more convenience such as extension of cruise mileage, the risk of ignition is increasing. Nowadays, battery systems for transportation machinery are often mounted at places near crew members, such as vehicle compartments. In case of ignition, sufficient evacuation time (about five minutes) for crew members is hardly ensured by conventional safety measures. Thus, new safety measures are awaited.

Conventional battery pack covers are made from iron. To meet the demand for reducing the weight, replacing iron with aluminum or resin is suggested. However, if battery cells in battery systems ignite, aluminum or resin covers cannot prevent flame and smoke from spreading. Measures to take for this issue are also necessary.

With regard to battery packs having a lower face reinforced with metal, the inner temperature of such battery packs rises when the transportation machinery makes contact with flame from a road, possibly causing thermal runaway of the cells and ignition. It is therefore necessary to prevent fire from penetrating into the battery packs and prevent an increase in the temperature inside the battery packs. Fuel cell vehicles are equipped with a hydrogen tank which has a risk of explosion, and thus measures to deal with external flames are also necessary. Moreover, small hydrogen tanks or light-weight hydrogen tanks are developed and used for space expansion of vehicle compartments or free layout design. If the number of equipped hydrogen tanks is increased, the parts possibly to contact fire may not be identified. Thus, covers to enclose the entirety of a battery pack or a hydrogen tank also need measures against heat or ignition.

The present invention can provide a molded article having high heat resistance, high flame retardancy, excellent impact resistance, excellent chemical resistance, and excellent transparency. The molded article can suitably be used as a member of transportation machinery or battery systems.

Examples of the transportation machinery include automobiles such as gasoline-powered automobiles, hybrid vehicles, electric vehicles, and fuel cell vehicles; motorcycles such as gasoline-powered motorcycles, hybrid motorcycles, and electric motorcycles; bicycles such as power assisted bicycles; railway vehicles; vessels; and aircraft.

Examples of the member of transportation machinery include mechanism members, interior members, exterior members, window glass, and light covers.

Examples of the mechanism members include cooling pipes, air bag covers, air ducts, and heater units.

Examples of the interior members include ceiling, instrument panels, console boxes, arm rests, seat belt buckles, switches, and door trims.

Examples of the exterior members include emblems, number plate housings, bumper cores, and under covers.

Examples of the battery systems include primary batteries such as nickel manganese batteries, lithium batteries, and zinc-air batteries; secondary batteries such as nickel hydrogen batteries, lithium-ion batteries, and lead storage batteries; solar cells such as silicon solar cells, dye-sensitized solar cells, and perovskite solar cells; and fuel cells such as solid polymer fuel cells, alkali fuel cells, phosphoric acid fuel cells, and solid oxide fuel cells.

Examples of the member of battery systems include battery cases, battery cooling water jackets, hydrogen tank covers, connectors, and insulation sheets.

In the molded article of the present invention, the lower limit of the developed interfacial area ratio (Sdr) is preferably 0.0001 and the upper limit thereof is preferably 0.003. This allows the molded article to have a uniform surface.

The Sdr can be measured using a 3D measurement system (produced by Keyence Corporation, VR-3100), for example.

The molded article of the present invention preferably has a surface roughness (Rmax) of 1.0 μm or less.

The molded article of the present invention preferably has a filtered waviness center line average (WcA) at an outer surface of 5.0 μm or less. Such a molded article has less surface unevenness and less thickness variations. In the present invention, the filtered waviness center line average as well as the surface roughness is low, which allows the molded article to have less friction with flowing water and to increase the flow rate when used as a pipe or the like.

The surface roughness (Rmax) can be measured by a method in conformity with JIS B 0601. The filtered waviness center line average (WcA) can be measured by a method in conformity with JIS B 0610.

Advantageous Effects of Invention

The present invention can provide a chlorinated polyvinyl chloride resin that not only has high heat resistance and high mechanical strength but also is excellent in molding processability and is very easy to soften and additionally enables production of a molded article with high gloss.

DESCRIPTION OF EMBODIMENTS

Figure 1:
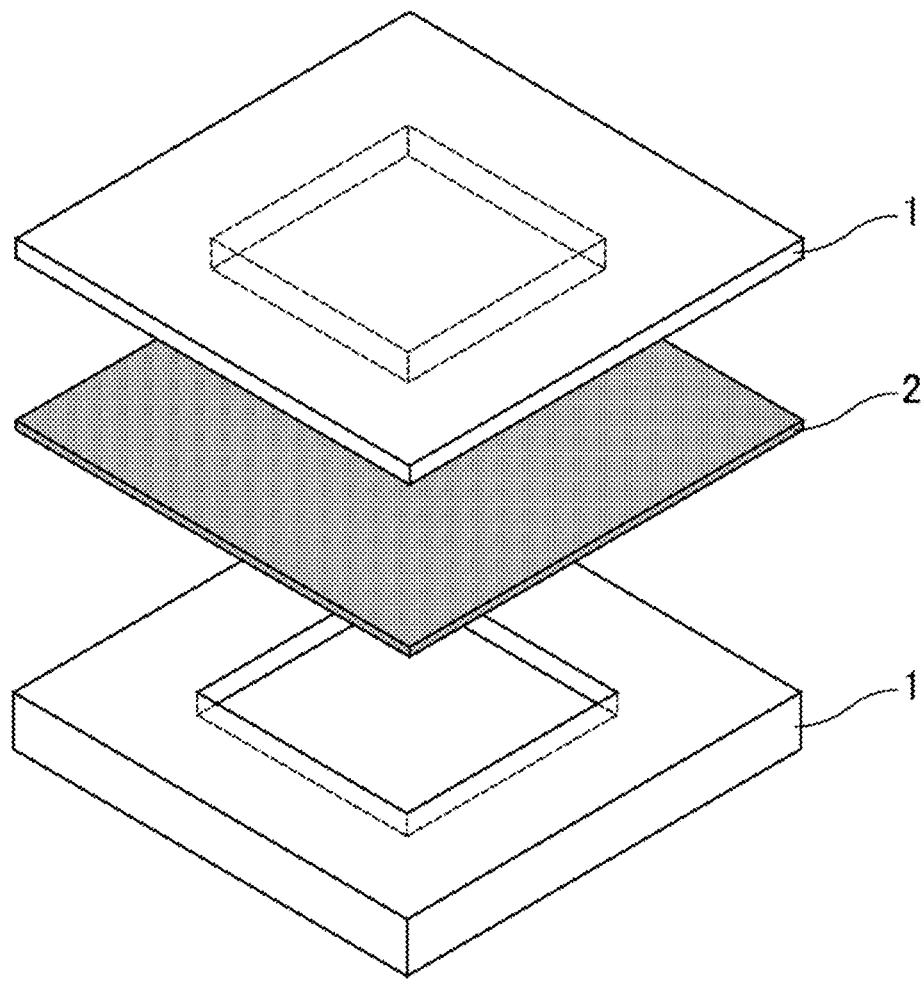
FIG. 1 shows a perspective view of recession and projection dies and an evaluation sheet used for moldability evaluation.

The present invention is hereinafter described in more detail with reference to examples; however, the present invention should not be limited to the examples.

Example 1

A glass-lined reaction vessel having an inner capacity of 300 L was charged with 130 kg of ion-exchanged water and 50 kg of a polyvinyl chloride having an average degree of polymerization of 1,000. They were stirred to disperse the polyvinyl chloride in water to prepare an aqueous suspension, and then the inside of the reaction vessel was heated to raise the temperature of the aqueous suspension to 70° C. Subsequently, the inside of the reaction vessel was depressurized to remove oxygen (oxygen content 100 ppm). Thereafter, while stirring was performed such that the vortex formed at the liquid-gas interface by stirring had a vortex volume of 2.5 L, chlorine (oxygen content 50 ppm) was introduced at a partial pressure of chlorine of 0.040 MPa, and then irradiation of ultraviolet light having a wavelength of 365 nm was performed at an irradiation intensity of 160 W with a high-pressure mercury lamp, thereby starting chlorination reaction.

Then, the chlorination temperature was kept at 70° C. and the partial pressure of chlorine was kept at 0.04 MPa. The average chlorine consumption rate was adjusted to 0.02 kg/PVC-kg·5 min. When the amount of added chlorine reached 10.3% by mass, the irradiation of ultraviolet light with a high-pressure mercury lamp and the supply of chlorine gas were terminated, whereby chlorination was terminated.

Next, unreacted chlorine was removed by nitrogen gas aeration, and the obtained chlorinated polyvinyl chloride resin slurry was neutralized with sodium hydroxide, washed with water, dehydrated, and then dried. Accordingly, a powdery, thermally chlorinated polyvinyl chloride resin (amount of added chlorine: 10.3% by mass) was obtained.

Examples 2 to 8, Comparative Examples 1 to 3 and 6

Chlorinated polyvinyl chloride resins were obtained as in Example 1, except that the average degree of polymerization of the raw material PVC, the reaction temperature, the vortex volume in stirring, the average chlorine consumption rate, and the amount of added chlorine were changed as indicated in Tables 1 and 2.

Comparative Example 4

A glass-lined reaction vessel having an inner capacity of 300 L was charged with 130 kg of ion-exchanged water and 50 kg of a polyvinyl chloride having an average degree of polymerization of 1,000. They were stirred to disperse the polyvinyl chloride in water to prepare an aqueous suspension, and then the inside of the reaction vessel was heated to raise the temperature of the aqueous suspension to 140° C. Subsequently, the inside of the reaction vessel was depressurized to remove oxygen (oxygen content 100 ppm). Thereafter, while stirring was performed such that the vortex formed at the liquid-gas interface by stirring had a vortex volume of 34.5 L, chlorine (oxygen content 50 ppm) was introduced at a partial pressure of chlorine of 0.40 MPa, thereby starting thermal chlorination.

Then, the chlorination temperature was kept at 140° C. and the partial pressure of chlorine was kept at 0.40 MPa. After the amount of added chlorine reached 4.0% by mass, addition of a 200 ppm hydrogen peroxide solution was started at 15 ppm/Hr in terms of hydrogen peroxide relative to the polyvinyl chloride, and the average chlorine consumption rate was adjusted to 0.04 kg/PVC-kg·5 min. When the amount of added chlorine reached 15.7% by mass, the supply of the hydrogen peroxide solution and chlorine gas was terminated, whereby chlorination was terminated.

Next, unreacted chlorine was removed by nitrogen gas aeration, and the obtained chlorinated polyvinyl chloride resin slurry was neutralized with sodium hydroxide, washed with water, dehydrated, and then dried. Accordingly, a powdery, thermally chlorinated polyvinyl chloride resin (amount of added chlorine: 15.7% by mass) was obtained.

Comparative Examples 5, 7, and 8

Chlorinated polyvinyl chloride resins were obtained as in Comparative Example 4, except that the average degree of polymerization of the raw material PVC, the reaction temperature, the vortex volume in stirring, the average chlorine consumption rate, and the amount of added chlorine were changed as indicated in Table 2.
(Evaluation)
The chlorinated polyvinyl chloride resins obtained in the examples and the comparative examples were evaluated as follows. Tables 1 and 2 show the results.
(1) Pulse NMR Measurement
The powdery chlorinated polyvinyl chloride resin was placed in a glass sample tube having a diameter of 10 mm (produced by BRUKER, Product No. 1824511, 10 mm in diameter, 180 mm in length, flat bottom) so as to fall within the measurement range of a pulse NMR apparatus. The sample tube was set in the pulse NMR apparatus (produced by BRUKER, "the minispec mq20") and subjected to heating while the temperature was stepwise raised from 30° C. (for 10 minutes), 100° C. (for 30 minutes), and 150° C. (for 30 minutes).

Measurements by the solid echo method were performed at 30° C., 100° C., and 150° C. under the conditions below, thereby obtaining free induction decay curves of $^1$H spin-spin relaxation.
<Solid Echo Method>
  Scans: 128 times
  Recycle delay: 1 sec
  Acquisition scale: 0.5 ms
(Measurement at 150° C.)
The free induction decay curve obtained in the measurement at 150° C. was subjected to waveform separation into three curves derived from the $A_{150}$ component, the $B_{150}$ component, and the $C_{150}$ component. The waveform separation was performed by fitting to both a Gaussian model and an exponential model. The percentages of the three components were determined from the curves derived from the components obtained in the measurements.

Using analytical software "TD-NMRA (Version 4.3, Rev. 0.8)" produced by BRUKER, the $A_{150}$ component and the $B_{150}$ component were fitted to a Gaussian model, and the $C_{150}$ component was fitted to an exponential model in conformity with the product manual.
The following equation was used in the fitting.

$$Y = A \times \exp\left(-\frac{1}{2} \times \left(\frac{t}{T_A}\right)^2\right) + B \times \exp\left(-\frac{1}{2} \times \left(\frac{t}{T_B}\right)^2\right) + C \times \left(-\frac{t}{T_c}\right) \quad \text{[Math. 1]}$$

In the formula, A represents the percentage of the $A_{150}$ component, B represents the percentage of the $B_{150}$ component, C represents the percentage of the $C_{150}$ component, $T_A$ represents the relaxation time of the $A_{150}$ component, $T_B$ represents the relaxation time of the $B_{150}$ component, Tc represents the relaxation time of the $C_{150}$ component, and t represents time.

The $A_{150}$ component, the $B_{150}$ component, and the $C_{150}$ component are components defined in order of shorter relaxation time in pulse NMR measurement. The value of the relaxation time of each component is not limited. Usually, the relaxation time of the $A_{150}$ component is less than 0.020 ms; the relaxation time of the $B_{150}$ component is from 0.020 ms to less than 0.090 ms; and the relaxation time of the $C_{150}$ component is 0.090 ms or more.
(Measurements at 30° C. and 100° C.)
The free induction decay curves obtained in the measurements at 30° C. and 100° C. were each subjected to waveform separation into two curves derived from the $A_{30}$ component and the $B_{30}$ component or two curves derived from the $A_{100}$ component and the $B_{100}$ component. The waveform separation was performed by fitting to both a Gaussian model and an exponential model. The percentages of the two components were determined from the curves derived from the components obtained in the measurements.

Using analytical software "TD-NMRA (Version 4.3, Rev. 0.8)" produced by BRUKER, the $A_{30}$ component and the $A_{100}$ component were fitted to a Gaussian model, and the $B_{30}$ component and the $B_{100}$ component were fitted to an exponential model in conformity with the product manual.
The following equation was used in the fitting.

$$Y = A \times \exp\left(-\frac{1}{2} \times \left(\frac{t}{T_A}\right)^2\right) + B \times \exp\left(-\frac{t}{T_B}\right) \quad \text{[Math. 2]}$$

In the formula, A represents the percentage of the $A_{30}$ component or the $A_{100}$ component, B represents the percentage of the $B_{30}$ component or the $B_{100}$ component, $T_A$ represents the relaxation time of the $A_{30}$ component or the $A_{100}$ component, $T_B$ represents the relaxation time of the $B_{30}$ component or the $B_{100}$ component, and t represents time.

The $A_{30}$ component and the $B_{30}$ component, or the $A_{100}$ component and the $B_{100}$ component are components defined in order of shorter relaxation time in pulse NMR measurement. The value of the relaxation time of each component is not limited. Usually, the relaxation time of the A component is less than 0.020 ms; and the relaxation time of the B component is 0.020 ms or more.
(2) Measurement of Amount of Added Chlorine
The amount of added chlorine was measured for each of the obtained chlorinated polyvinyl chloride resins in conformity with JIS K 7229.

(3) Molecular Structure Analysis

The molecular structure of each of the obtained chlorinated polyvinyl chloride resins was analyzed in conformity with the NMR measurement method described in R. A. Komoroski, R. G. Parker, J. P. Shocker, Macromolecules, 1985, 18, 1257-1265 so as to determine the amount of the structural units (a), (b), and (c).

The NMR measurement conditions were as follows.

Apparatus: FT-NMRJEOLJNM-AL-300

Measured nuclei: 13C (proton complete decoupling)

Pulse width: 90°

PD: 2.4 sec

Solvent: o-dichlorobenzene:deuterated benzene (C5D5)=3:1

Sample concentration: about 20%

Temperature: 110° C.

Reference material: central signal for benzene set to 128 ppm

Number of scans: 20,000

(4) Developed Interfacial Area Ratio (Sdr)

(Production of Chlorinated Polyvinyl Chloride Resin Composition)

An amount of 5.0 parts by mass of an impact resistance modifier was added to 100 parts by mass of each of the obtained chlorinated polyvinyl chloride resins. Then, 1.4 parts by mass of a thermal stabilizer was added and mixed. The impact resistance modifier used was Kane Ace B-564 (produced by Kaneka Corporation, methyl methacrylate-butadiene-styrene copolymer). The thermal stabilizer used was TVS #1380 (produced by Nitto Kasei Co., Ltd., organotin stabilizer).

Further, 2.0 parts by mass of a polyethylene lubricant (produced by Mitsui Chemicals, Inc., Hiwax 220MP) and 0.3 parts by mass of a fatty acid ester lubricant (produced by Emery Oleochemicals Japan Ltd., LOXIOL G-32) were added. They were uniformly mixed in a super mixer, whereby a chlorinated polyvinyl chloride resin composition was obtained.

(Production of Extrusion-Molded Article)

The obtained chlorinated polyvinyl chloride resin composition was fed into a twin-screw counter-rotating conical extruder with a diameter of 50 mm (produced by Osada Seisakusho, SLM-50) to prepare a sheet-shaped molded article with a thickness of 2 mm and a width of 80 mm at a resin temperature of 205° C., a back pressure of 120 to 140 kg/cm$^2$, and an extrusion amount of 50 kg/hr.

(Sdr Measurement)

The Sdr value of a surface of the obtained molded article was measured using a 3D measurement system (produced by Keyence Corporation, VR-3100). Each Sdr value shown in Tables 1 and 2 is the average of five measurement regions.

Sdr is a ratio representing the degree of increase in the surface area of the measured region compared to the area of the measured region. A completely level surface has an Sdr of 0. A molded article having a low Sdr has excellent flatness. For example, the use of the molded article as a pipe-shaped molded article for plumbing or the like can reduce noise when water is running.

(5) Surface Shape (Unevenness)

The surface shape of the molded article was examined visually and by touch, and evaluated in accordance with the following criteria.

○ (Good): Neither the visual examination nor the touch examination found surface irregularities.

Δ (Fair): The visual examination found no surface irregularities but the touch examination found surface irregularities.

x (Poor): The visual examination found surface irregularities.

(6) Gloss

The gloss of the molded article obtained in "(4) Developed interfacial area ratio (Sdr)" was visually examined and evaluated in accordance with the following criteria.

○ (Good): The visual examination found gloss on the surface.

z (Poor): The visual examination did not find gloss on the surface.

(7) Thermal Moldability

A solution was prepared by mixing 20% by mass of the obtained chlorinated polyvinyl chloride resin, 79% by mass of tetrahydrofuran (THF, FUJIFILM Wako Pure Chemical Corporation), and 1% by mass of a thermal stabilizer (organotin thermal stabilizer, TVS #1380, Nitto Kasei Co., Ltd.).

A glass fiber was immersed in the solution by the hand lay-up technique. By repeating this operation for five times, a five-layer solution-immersed glass fiber was obtained.

The solution-immersed glass fiber was molded into a shape of 15 cm×15 cm×2.5 mm in thickness, and then THF was dried, thereby preparing a resin-immersed glass fiber sheet. The resulting sheet was placed between Teflon (®) sheets, and the workpiece was subjected to hot pressing at 200° C. at a pressure of 0.2 MPa for three minutes and at a pressure of 10 MPa for three minutes using a hot press machine, thereby preparing a 2 mm-thick evaluation sheet.

Figure 2:
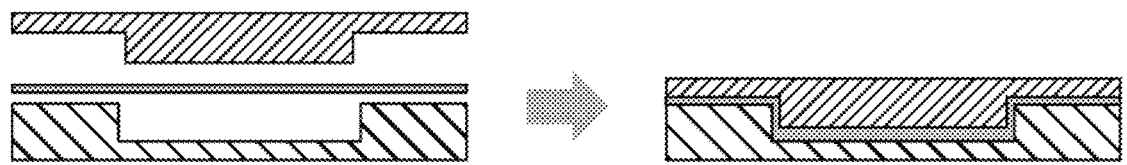
FIG. 2 shows a cross-sectional view illustrating moldability evaluation.

Next, recession and projection dies (assumed as a cover for batteries) shown in FIG. 1 were preliminary heated to 200° C. by a hot press machine. Then, the evaluation sheet was sandwiched between the dies and maintained at 200° C. and at 2 MPa for five minutes as shown in FIG. 2 and further maintained at 10 MPa for five minutes. Subsequently, the dies were cooled by cold pressing, and then the evaluation sheet was recovered from the dies. Edges of the sheet were visually observed and evaluated in accordance with the following criteria.

○ (Good): No fracture was observed.

Δ (Fair): Small fractures were observed.

x (Poor): Fractures were observed.

(8) Mechanical Strength (Izod Impact Strength)

The obtained chlorinated polyvinyl chloride resin composition was fed into two 8-inch rolls and kneaded at 205° C. for three minutes to prepare 1.0-mm-thick sheets. The obtained sheets were stacked and preheated with a 205° C. press for three minutes. Subsequently, the sheets were pressurized for four minutes to prepare a 3-mm-thick press plate. The obtained press plate was mechanically processed to cut a test specimen therefrom. The Izod impact strength of the test specimen was measured in conformity with ASTM D256.

TABLE 1

| | | | | Example | | | | | | | |
|---|---|---|---|---|---|---|---|---|---|---|---|
| | | | | 1 | 2 | 3 | 4 | 5 | 6 | 7 | 8 |
| Production method | Raw material PVC | Average degree of polymerization | | 1000 | 1000 | 1000 | 1000 | 350 | 450 | 1900 | 1000 |
| | | Charge amount | kg | 50 | 50 | 50 | 50 | 50 | 50 | 50 | 50 |
| | Water | Ion-exchanged water | kg | 130 | 130 | 130 | 130 | 130 | 130 | 130 | 130 |
| | Chlorination conditions | Reaction temperature | °C. | 70 | 70 | 70 | 70 | 70 | 70 | 70 | 70 |
| | | Reaction pressure | Mpa | 0.04 | 0.04 | 0.04 | 0.04 | 0.04 | 0.04 | 0.04 | 0.04 |
| | | PVC + water | kg | 180 | 180 | 180 | 180 | 180 | 180 | 180 | 180 |
| | | Vortex volume in stirring | L | 2.5 | 2.9 | 25.1 | 20.1 | 18.4 | 12.0 | 22.3 | 25.5 |
| | | Vortex volume/(PVC + water) | L/kg | 0.014 | 0.016 | 0.139 | 0.112 | 0.102 | 0.067 | 0.124 | 0.142 |
| | | Average chlorine consumption rate | kg/pvc-kg · 5 min | 0.02 | 0.02 | 0.02 | 0.02 | 0.02 | 0.02 | 0.02 | 0.02 |
| | | 200 ppm hydrogen peroxide | ppm/hr | — | — | — | — | — | — | — | — |
| | | Wavelength of UV light | nm | 365 | 365 | 365 | 365 | 365 | 365 | 365 | 365 |
| Chlorinated polyvinyl chloride resin | Amount of added chlorine | | mass % | 10.3 | 4.7 | 13.1 | 10.7 | 10.4 | 11.2 | 10.9 | 10.9 |
| | Structure | Structural unit (a) —CH$_2$—CHCl— | mol % | 35.9 | 72.6 | 21.5 | 36.2 | 37.6 | 33.1 | 35.0 | 34.5 |
| | | Structural unit (b) —CH$_2$—CCl$_2$— | mol % | 22.4 | 10.7 | 31.3 | 25.6 | 23.4 | 26.4 | 19.0 | 28.4 |
| | | Structural unit (c) —CHCl—CHCl— | mol % | 41.7 | 16.7 | 47.2 | 38.2 | 39.0 | 40.5 | 46.0 | 37.1 |
| | Pulse NMR | 30° C. Percentage $A_{30}$ | % | 99.1 | 99.1 | 99.1 | 99.1 | 99.1 | 99.1 | 99.1 | 99.1 |
| | | $B_{30}$ | % | 0.9 | 0.9 | 0.9 | 0.9 | 0.9 | 0.9 | 0.9 | 0.9 |
| | | Relaxation time $A_{30}$ | ms | 0.011 | 0.011 | 0.011 | 0.011 | 0.011 | 0.011 | 0.011 | 0.011 |
| | | $B_{30}$ | ms | — | — | — | — | — | — | — | — |
| | | 100° C. Percentage $A_{100}$ | % | 88.6 | 89.3 | 91.0 | 90.5 | 86.7 | 86.3 | 99.3 | 90.6 |
| | | $B_{100}$ | % | 11.4 | 10.7 | 9.0 | 9.5 | 13.4 | 13.8 | 0.7 | 9.4 |
| | | Relaxation time $A_{100}$ | ms | 0.0119 | 0.0108 | 0.0116 | 0.0114 | 0.0117 | 0.0118 | 0.0122 | 0.0114 |
| | | $B_{100}$ | ms | 0.0254 | 0.0266 | 0.0241 | 0.0248 | 0.0204 | 0.0213 | 0.0343 | 0.0247 |
| | | 150° C. Percentage $A_{150}$ | % | 64.7 | 47.9 | 72.2 | 65.5 | 65.4 | 65.3 | 61.9 | 66.3 |
| | | $B_{150}$ | % | 25.3 | 38.4 | 19.5 | 24.9 | 26.4 | 26.2 | 20.8 | 24.5 |
| | | $C_{150}$ | % | 10.0 | 13.8 | 8.3 | 9.6 | 8.3 | 8.5 | 17.3 | 9.2 |
| | | Relaxation time $A_{150}$ | ms | 0.0128 | 0.0144 | 0.0144 | 0.0144 | 0.0118 | 0.0120 | 0.0149 | 0.1503 |
| | | $B_{150}$ | ms | 0.0294 | 0.0422 | 0.0237 | 0.0290 | 0.0222 | 0.0232 | 0.0377 | 0.0285 |
| | | $C_{150}$ | ms | 0.1515 | 0.1689 | 0.1437 | 0.1509 | 0.1273 | 0.1303 | 0.1738 | 0.0133 |
| | | Relaxation time of $A_{150}$ component × Percentage of $C_{150}$ component | ms · % | 0.1272 | 0.1983 | 0.1196 | 0.1385 | 0.0977 | 0.1026 | 0.2583 | 1.3888 |
| Molded article | | Sdr | | 0.0005 | 0.001 | 0.0015 | 0.0009 | 0.0003 | 0.0005 | 0.0015 | 0.0005 |
| | | Surface shape (unevenness) | | ○ | ○ | ○ | ○ | ○ | ○ | ○ | ○ |
| | | Gloss | | ○ | ○ | ○ | ○ | ○ | ○ | ○ | ○ |
| | | Thermal moldability | | ○ | ○ | ○ | ○ | ○ | ○ | ○ | ○ |
| | | Mechanical strength (Izod impact strength) | | 65.2 | 80.1 | 43.5 | 61.9 | 19.3 | 30.2 | 86.2 | 62.9 |

TABLE 2

| | | | | Comparative Example | | | | | | | |
|---|---|---|---|---|---|---|---|---|---|---|---|
| | | | | 1 | 2 | 3 | 4 | 5 | 6 | 7 | 8 |
| Production method | Raw material PVC | Average degree of polymerization | | 1000 | 1000 | 1000 | 1000 | 600 | 600 | 1200 | 300 |
| | | Charge amount | kg | 50 | 50 | 50 | 50 | 50 | 50 | 50 | 50 |
| | Water | Ion-exchanged water | kg | 130 | 130 | 130 | 130 | 130 | 130 | 130 | 130 |
| | Chlorination conditions | Reaction temperature | °C. | 70 | 70 | 70 | 140 | 100 | 100 | 110 | 110 |
| | | Reaction pressure | Mpa | 0.04 | 0.04 | 0.04 | 0.40 | 0.40 | 0.40 | 0.04 | 0.04 |
| | | PVC + water | kg | 180 | 180 | 180 | 180 | 180 | 180 | 180 | 180 |
| | | Vortex volume in stirring | L | 0.9 | 43.2 | 33.8 | 34.5 | 38.9 | 1.1 | 35.5 | 1.2 |
| | | Vortex volume/(PVC + water) | L/kg | 0.005 | 0.240 | 0.188 | 0.192 | 0.216 | 0.006 | 0.197 | 0.007 |
| | | Average chlorine consumption rate | kg/pvc-kg · 5 min | 0.01 | 0.02 | 0.02 | 0.04 | 0.02 | 0.02 | 0.02 | 0.02 |

TABLE 2-continued

| | | | | Comparative Example | | | | | | | |
|---|---|---|---|---|---|---|---|---|---|---|---|
| | | | | | 1 | 2 | 3 | 4 | 5 | 6 | 7 | 8 |
| | | 200 ppm hydrogen peroxide | ppm/hr | — | — | — | 50 | 50 | — | 50 | 50 |
| | | Wavelength of UV light | nm | 365 | 365 | 365 | — | — | 365 | — | — |
| Chlorinated polyvinyl chloride resin | Amount of added chlorine | | mass % | 10.3 | 15.4 | 3.2 | 15.7 | 13.4 | 3.1 | 15.6 | 10.3 |
| | Structure | Structural unit (a) —$CH_2$—CHCl— | mol % | 36.0 | 7.0 | 82.0 | 6.4 | 19.5 | 82.5 | 6.3 | 37.2 |
| | | Structural unit (b) —$CH_2$—$CCl_2$— | mol % | 37.1 | 72.2 | 9.9 | 38.2 | 33.3 | 9.9 | 56.2 | 23.3 |
| | | Structural unit (c) —CHCl—CHCl— | mol % | 26.9 | 20.8 | 8.1 | 55.4 | 47.2 | 7.6 | 37.5 | 39.5 |
| | Pulse NMR | 30° C. Percentage $A_{30}$ | % | 99.2 | 99.1 | 99.1 | 99.1 | 99.1 | 99.1 | 99.1 | 99.1 |
| | | $B_{30}$ | % | 0.8 | 0.9 | 0.9 | 0.9 | 0.9 | 0.9 | 0.9 | 0.9 |
| | | Relaxation time $A_{30}$ | ms | 0.011 | 0.011 | 0.011 | 0.011 | 0.011 | 0.011 | 0.011 | 0.011 |
| | | $B_{30}$ | ms | — | — | — | — | — | — | — | — |
| | | 100° C. Percentage $A_{100}$ | % | 91.2 | 91.5 | 89.0 | 90.7 | 87.6 | 87.4 | 93.0 | 91.2 |
| | | $B_{100}$ | % | 8.8 | 8.5 | 11.0 | 9.3 | 12.4 | 12.6 | 7.0 | 8.8 |
| | | Relaxation time $A_{100}$ | ms | 0.0120 | 0.0118 | 0.0106 | 0.0129 | 0.0119 | 0.0119 | 0.0121 | 0.0118 |
| | | $B_{100}$ | ms | 0.0262 | 0.0234 | 0.0270 | 0.0290 | 0.0226 | 0.0218 | 0.0280 | 0.2510 |
| | | 150° C. Percentage $A_{150}$ | % | 65.5 | 83.8 | 51.3 | 85.6 | 63.2 | 66.1 | 67.6 | 66.2 |
| | | $B_{150}$ | % | 28.0 | 15.5 | 41.4 | 10.8 | 29.0 | 26.3 | 28.4 | 28.1 |
| | | $C_{150}$ | % | 6.5 | 0.7 | 7.3 | 3.6 | 7.8 | 7.6 | 4.0 | 5.7 |
| | | Relaxation time $A_{150}$ | ms | 0.0125 | 0.0129 | 0.0141 | 0.0123 | 0.0125 | 0.0123 | 0.0125 | 0.0125 |
| | | $B_{150}$ | ms | 0.0274 | 0.0186 | 0.0455 | 0.0198 | 0.0285 | 0.0247 | 0.0163 | 0.0261 |
| | | $C_{150}$ | ms | 0.1127 | 0.1368 | 0.1734 | 0.1047 | 0.1047 | 0.1348 | 0.1528 | 0.1231 |
| | | Relaxation time of $A_{150}$ component × Percentage of $C_{150}$ component | ms · % | 0.0810 | 0.0089 | 0.1023 | 0.0438 | 0.0969 | 0.0935 | 0.0497 | 0.0713 |
| Molded article | Sdr | | | 0.051 | 0.015 | 0.012 | 0.013 | 0.012 | 0.010 | 0.013 | 0.0009 |
| | Surface shape (unevenness) | | | × | × | × | × | × | × | × | ○ |
| | Gloss | | | × | × | × | × | × | × | × | ○ |
| | Thermal moldability | | | × | × | × | × | × | × | × | ○ |
| | Mechanical strength (Izod impact strength) | | | 65.2 | 39.9 | 85.1 | 34.6 | 35.1 | 74.8 | 40.1 | 10.3 |

INDUSTRIAL APPLICABILITY

The present invention can provide a chlorinated polyvinyl chloride resin that not only has high heat resistance and high mechanical strength but also is excellent in molding processability and is very easy to soften and additionally enables production of a molded article with high gloss.

REFERENCE SIGNS LIST 1 recession and projection dies
2 evaluation sheet

The invention claimed is:

1. A chlorinated polyvinyl chloride resin,
comprising three components including a $A_{150}$ component, a $B_{150}$ component, and a $C_{150}$ component, and having a percentage of the $C_{150}$ component ($C_{150}$ component/($A_{150}$ component+$B_{150}$ component+$C_{150}$ component)) of 8.0% or more and 50.0% or less,
the three components being identified by measuring the chlorinated polyvinyl chloride resin by a solid echo method using pulse NMR at 150° C. to give a free induction decay curve of $^1$H spin-spin relaxation, and subjecting the free induction decay curve to waveform separation into three curves derived from the $A_{150}$ component, the $B_{150}$ component, and the $C_{150}$ component in order of shorter relaxation time using the least square method,
wherein the chlorinated polyvinyl chloride resin has a degree of polymerization of 100 to 2,000, and
wherein the chlorinated polyvinyl chloride resin contains units (a) to (c) represented by the following formulas (a) to (c), and a proportion of the structural unit (a) is 5.0 mol % or higher and 90.0 mol % or lower, a proportion of the structural unit (b) is 5.0 mol % or higher and 40.0 mol % or lower, and a proportion of the structural unit (c) is 5.0 mol % or higher and 55.0 mol % or lower, relative to total number of moles of the structural units (a), (b), and (c)

$$—CH_2—CHCl— \qquad (a)$$

$$—CH_2—CCl_2— \qquad (b)$$

$$—CHCl—CHCl— \qquad (c).$$

2. The chlorinated polyvinyl chloride resin according to claim 1,
wherein the chlorinated polyvinyl chloride resin comprises two components including a $A_{100}$ component and a $B_{100}$ component, and has a percentage of the $B_{100}$ component ($B_{100}$ component/($A_{100}$ component+$B_{100}$ component)) of 9.0% or more and 30.0% or less, and
the two components are identified by measuring the chlorinated polyvinyl chloride resin by a solid echo method using pulse NMR at 100° C. to give a free induction decay curve of 1H spin-spin relaxation, and subjecting the free induction decay curve to waveform separation into two curves derived from the $A_{100}$ component and the $B_{100}$ component in order of shorter relaxation time using the least square method.

3. The chlorinated polyvinyl chloride resin according to claim 1, having an amount of added chlorine of 1.0 to 16.0% by mass.

4. A resin composition for molding, comprising the chlorinated polyvinyl chloride resin according to claim 1.

5. The resin composition for molding according to claim 4, comprising 1 to 30% by mass of an impact resistance modifier.

6. A molded article molded from the resin composition for molding according to claim 4.

7. The molded article according to claim 6, further comprising a glass fiber or a carbon fiber.

8. The molded article according to claim 6, which is a member for use in transportation machinery.

9. The molded article according to claim 6, which is a member for use in battery systems.

10. The chlorinated polyvinyl chloride resin according to claim 1,
wherein the chlorinated polyvinyl chloride resin has an amount of added chlorine of 3.2 to 12.2% by mass, and
the proportion of the structural unit (a) is 21.5 mol % or higher and 72.6 mol % or lower, the proportion of the structural unit (b) is 10.7 mol % or higher and 31.3 mol % or lower, and the proportion of the structural unit (c) is 16.7 mol % or higher and 55.0 mol % or lower.

* * * * *